UNITED STATES PATENT OFFICE.

CHRISTIAN RUDOLPH AND BERNHARD PRIEBS, OF OFFENBACH-ON-THE-MAIN, GERMANY, ASSIGNORS TO K. OEHLER, OF SAME PLACE.

YELLOW COLORING-MATTER.

SPECIFICATION forming part of Letters Patent No. 396,294, dated January 15, 1889.

Application filed June 13, 1888. Serial No. 276,970. (No specimens.)

*To all whom it may concern:*

Be it known that we, CHRISTIAN RUDOLPH and BERNHARD PRIEBS, subjects of the Emperor of Germany, and residing at Offenbach-on-the-Main, Germany, have invented new and useful Improvements in Yellow Coloring-Matter, of which the following is a specification.

Our method of producing these new dye-stuffs consists of two distinct operations. By the first we produce by the action of tetrazodiphenyl or ditolyl chloride upon one molecule of β cresotinic acid (*Beilstein's Handbook*, first edition, page 1458) a peculiar so-called "intermediate" body of the formula—

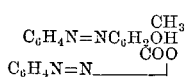

which in the second operation is brought together with salicylate of soda to form the new dye-stuff.

We proceed as follows:

*First, method of producing the intermediate body of benzidin and β cresotinic acid.*—18.4 pounds of benzidin are dissolved in forty-eight pounds of muriatic acid of 20° Baumé and five hundred pounds of water cooled with ice and mixed with a solution of twenty-eight pounds of nitrate of soda in one hundred and fifty pounds of water. The solution of tetrazodiphenylchloride thus prepared is allowed to run slowly into a solution of 15.2 pounds of β cresotinic acid and twenty pounds of soda in three hundred pounds of water. The intermediate compound formed precipitates slowly as voluminous yellow-brown flakes, and is filtered off.

*Second, production of the dye-stuff.*—A solution of 13.6 pounds of salicylic acid and twenty-five pounds hydrate of soda in three hundred pounds of water is prepared, and the whole quantity of the intermediate body above obtained is added to it. The formation of the dye-stuff begins at once. It is filtered off, pressed, and dried as soon as the reaction is finished.

The dye-stuff is a brown-yellow powder composed of tetrazodiphenylchloride and one molecule cresotinic acid and one molecule salicylic acid with the formula $C_{27}H_{18}N_4O_6Na_2$. It is easily soluble in hot water. In concentrated sulphuric acid it dissolves with a violet-red color. By this reaction it distinguishes itself clearly from Frank's similar dye-stuff, (United States Patent No. 329,638, of November 5, 1885,) which is composed of tetrazodiphenylchloride and two molecules of salicylic acid, and has the formula $C_{26}H_{16}N_4O_6Na_2$. It dissolves in concentrated sulphuric acid with a magenta-red color.

In the above-described process it is possible to substitute the γ cresotinic acid (*Beilstein's Handbook*, page 1459) for the β acid and the tolidin for the benzidin without altering the result, inasmuch as the use of the dye-stuff for dyeing and printing is concerned. The final product is in all cases a yellow dye-stuff of nearly the same shades and properties, which make them specially suited for dyeing cotton.

Having thus described our invention and the manner of employing the same, what we claim, and wish to have secured to us by Letters Patent of the United States of America, is—

The yellow azo dye-stuff herein described, produced from benzidin or tolidin, cresotinic acid and salicylic acid, and which is a brown-yellow powder easily soluble in hot water and dissolves in sulphuric acid with a violet-red color, substantially as herein set forth.

In testimony whereof we have signed our signatures to this specification in the presence of two subscribing witnesses.

CHRISTIAN RUDOLPH.
BERNHARD PRIEBS.

Witnesses as to Christian Rudolph:
JOSEPH PATRICK,
ALVESTO S. HOGUE.

Witnesses as to Bernhard Priebs:
JACOB MUELLER,
JEAN GRUND.